United States Patent
Kim

(10) Patent No.: US 8,942,734 B2
(45) Date of Patent: Jan. 27, 2015

(54) APPARATUS AND METHOD FOR PERIPHERAL DEVICE CONTROL IN PORTABLE TERMINAL

(75) Inventor: Dong-Hyeon Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 408 days.

(21) Appl. No.: 12/691,870

(22) Filed: Jan. 22, 2010

(65) Prior Publication Data

US 2010/0190527 A1    Jul. 29, 2010

(30) Foreign Application Priority Data

Jan. 23, 2009 (KR) .................. 10-2009-0005949

(51) Int. Cl.
*H04W 24/00* (2009.01)
*H04N 7/14* (2006.01)

(52) U.S. Cl.
CPC .................................. *H04N 7/147* (2013.01)
USPC ............... 455/456.4; 455/456.1; 455/404.1; 455/404.2

(58) Field of Classification Search
CPC .............................. H04W 4/02; H04W 48/02
USPC ............ 455/557, 558, 522, 404.1, 404.2, 455/456.1–456.4; 370/338, 347; 235/380, 235/382; 710/14, 20, 38, 41, 48
See application file for complete search history.

(56) References Cited

U.S. PATENT DOCUMENTS

| | | | |
|---|---|---|---|
| 7,784,693 B2 * | 8/2010 | Liao et al. | 235/451 |
| 8,180,400 B2 * | 5/2012 | Shin et al. | 455/558 |
| 2004/0121793 A1 * | 6/2004 | Weigele et al. | 455/522 |
| 2005/0245273 A1 * | 11/2005 | Kincaid | 455/456.4 |
| 2006/0105758 A1 * | 5/2006 | Maislos | 455/420 |
| 2006/0288133 A1 * | 12/2006 | Katibian et al. | 710/48 |
| 2007/0274277 A1 * | 11/2007 | Koizumi et al. | 370/338 |
| 2009/0088181 A1 * | 4/2009 | Savolainen | 455/456.1 |

* cited by examiner

*Primary Examiner* — Ping Hsieh
(74) *Attorney, Agent, or Firm* — Cha & Reiter, LLC.

(57) ABSTRACT

An apparatus and a method for a peripheral device control in a portable terminal are provided. In the method for the peripheral device control in the portable terminal, the method includes selectively changing a communication path between a communication modem and a storage to a communication path between a controller and the storage by controlling a switch when the communication modem is turned off, determining information necessary for the peripheral device control through the communication path between the controller and the storage and controlling the peripheral device when the information satisfies a control condition.

9 Claims, 3 Drawing Sheets

APPARATUS AND METHOD FOR PERIPHERAL DEVICE CONTROL IN PORTABLE TERMINAL

CLAIM OF PRIORITY

This application claims the benefit of an earlier Korean patent application filed in the Korean Intellectual Property Office on Jan. 23, 2009 and assigned Serial No. 10-2009-0005949, the entire disclosure of which is hereby incorporated by reference.

BACKGROUND OF THE INVENTION

1. Field of the Invention

The present invention relates to an apparatus and a method for determining user information from a Universal Subscriber Identity Module (USIM), for determining location information through a Remote Frequency (RF) receiving circuit attached to the USIM, and for controlling peripheral devices such as camera of the portable terminal when a modem of the portable terminal is turned off.

2. Description of the Related Art

In a portable terminal such as a mobile communication terminal or a smart phone, a camera and other devices are now provided in the portable terminal. Thus, a need exists for disabling a function of the camera or a specific device.

FIG. 1 illustrates a block diagram of a portable terminal in the prior art.

Referring to FIG. 1, the portable terminal comprises a camera 110, a PDA controller 120, a communication modem 125, and a Universal Subscriber Identity Module (USIM) 130.

The PDA controller 120 determines user information such as a phone number from the USIM 130 and also determines whether it is required for the portable terminal to control the camera 110.

When it is required for the portable terminal to control the camera 110, the PDA controller 120 determines whether a current location of the portable terminal belongs to a location which needs a camera 110 control based on information through the communication modem 125.

When it is required for the portable terminal to control the camera 110 and the current location of the portable terminal belongs to a location which needs the camera 110 control, the PDA controller 120 controls the camera 110 in the current location.

However, a portable terminal such as a smart phone uses a separate Central Processing Unit (CPU) such as the PDA controller 120 to turn off the communication modem 125. In this case, the USIM 130 coupled to the communication modem 125 is turned off together.

As a result, when the PDA controller 120 controls the function of the camera 100 in the portable terminal, it is impossible for the portable terminal to determine the user information from the USIM 130 and the location information through the communication modem 125 when the communication modem 125 is turned off.

Furthermore, it is impossible to control peripheral devices coupled to the smart phone.

Accordingly, a need exists for an apparatus and a method for the peripheral device control in the portable terminal.

SUMMARY OF THE INVENTION

An aspect of the present invention is to solve at least the above-mentioned problems and/or disadvantages and to provide at least the advantages described below. Accordingly, an aspect of the present invention is to provide an apparatus and a method for enabling a peripheral device control in a portable terminal.

Another aspect of the present invention is to provide an apparatus and method for establishing a communication path between a controller and a USIM, for determining user information from the USIM, for determining location information by implementing RF receiving circuit in the USIM, and for controlling peripheral devices provided in the portable terminal when the communication modem which controls the USIM is turned off in the portable terminal such as a smart phone.

In accordance with an aspect of the present invention, a method for a peripheral device control in a portable terminal includes changing a communication path between a communication modem and a storage to a communication path between a controller and the storage by controlling a switch when the communication modem is turned off, determining information necessary for the peripheral device control through the communication path between the controller and the storage and controlling the peripheral device when the information satisfies a control condition.

In accordance with another aspect of the present invention, an apparatus for enabling a peripheral device control in a portable terminal includes a controller for changing a communication path between a communication modem and a storage to a communication path between a controller and the storage by controlling a switch when the communication modem is turned off, for determining information necessary for the peripheral device control through the communication path between the controller and the storage and for controlling the peripheral device when the information satisfies a control condition.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

Hereinafter, exemplary embodiments of the present invention will be described below with reference to the accompanying drawings. For the purposes for clarity and simplicity, well-known functions or constructions are not described in detail as they would obscure the invention in unnecessary detail.

Figure 1:
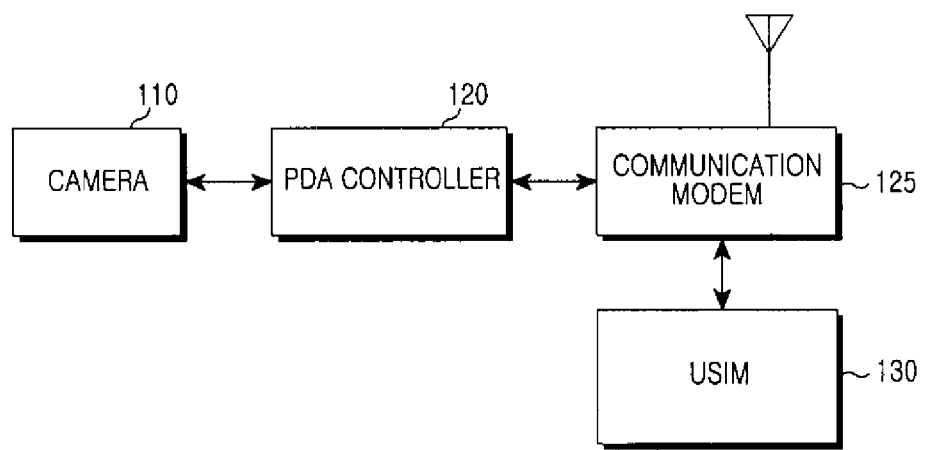
FIG. 1 illustrates a block diagram of a portable terminal in the prior art.
Figure 2:
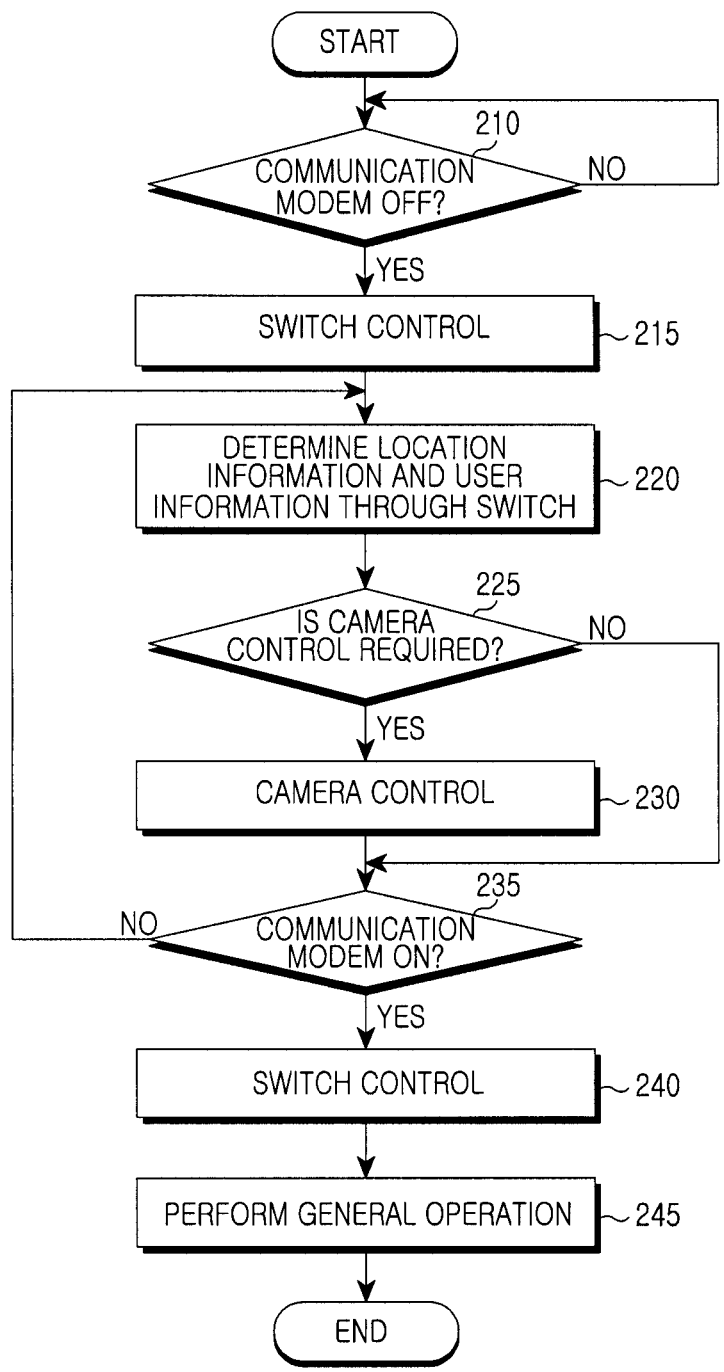
FIG. 2 illustrates a flowchart showing a control procedure of a portable terminal according to an exemplary embodiment of the present invention; and, FIG. 3 illustrates a block diagram of a portable terminal according to an exemplary embodiment of the present invention.

FIG. 2 illustrates a flowchart illustrating a control process of a portable terminal according to an exemplary embodiment of the present invention.

Referring to FIG. 2, an Universal Subscriber Identity Module (USIM) of the present invention includes a RF receiving circuit for determining base station information or may be coupled to RF receiving circuit. When a power is applied to the USIM, a signal receiving is possible for mobile communication.

The PDA controller determines whether the communication modem is turned on or off.

When the communication modem is turned off in step 210, the PDA controller controls the switch in step 215 and establishes a communication path between the PDA controller and the USIM.

Hereafter, the PDA controller determines user information through the switch from the USIM, and the PDA controller determines location information through the RF receiving circuit inside the USIM (or via a RF receiving circuit coupled to the USIM) of the portable terminal in step 220. The PDA controller determines the location information based on information, received from a base station, such as a pilot signal or advertisement information received via the base station.

When the PDA controller determines it is required for the portable terminal to control the camera based on the user information and the location information in step 225, the PDA controller controls the camera and disables the camera in step 230. A reason for the PDA controller to need the user information and the location information will be explained below.

A location information analysis performed by the PDA controller may indicate it is required for the portable terminal to control the camera when the portable terminal is located in a restricted region, and a user information analysis performed by the PDA controller may indicate it is required for the portable terminal to control the camera when the portable terminal is not authorized.

For example, the PDA controller controls the switch to determine the location information and the user information when the communication modem is turned off, and the PDA controller determines whether the portable terminal is authorized based on the location information and the user information.

If the portable terminal locates in a restricted region such as a military region which requires a high level authorization, it is required for the portable terminal to disable the peripheral device such as camera provided or coupled to the portable terminal. In this case, the PDA controller may disable the camera based on the location information and the user information when the portable terminal is not authorized. It should be noted the teachings of present invention is applicable to a theater or other areas where the camera or any of the peripheral device usage is not permitted or recommended.

Thereafter, the PDA controller determines whether the communication modem is turned on. When the communication modem is turned on in step 235, the PDA controller controls the switch in step 240 and establishes a communication path between the communication modem and the USIM. Then, the portable terminal performs the conventional operations in step 245.

When the PDA controller determines it is not required for the portable terminal to control the camera based on the user information and the location information in step 225, the PDA controller determines whether the communication modem is turned on, and when the communication modem is turned on in step 235, the PDA controller controls the switch in step 240 and establishes an communication path between the communication modem and the USIM. Then, the portable terminal performs the conventional operations in step 245.

When the communication modem is turned off in step 235, the PDA controller determines the location information through the RF receiving circuit inside the USIM (or via a RF receiving circuit coupled to the USIM) in step 220 and repeats remaining steps as explained above.

Figure 3:
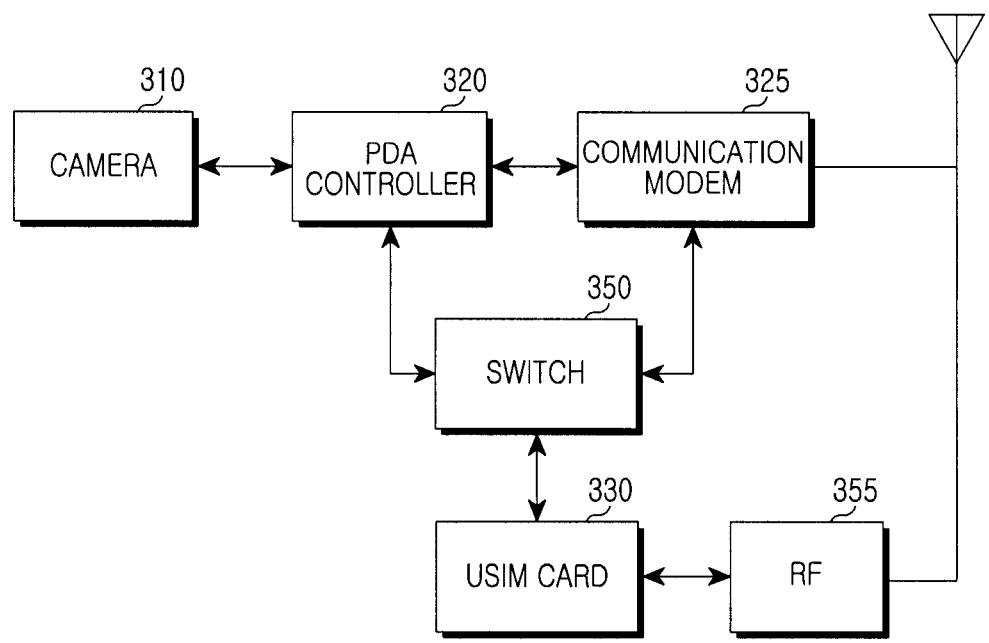

FIG. 3 illustrates a block diagram of a portable terminal according to an exemplary embodiment of the present invention.

Referring to FIG. 3, the portable terminal comprises a camera 310, a PDA controller 320, a communication modem 325, a USIM 330, a switch 350, and a Radio Frequency (RF) 355.

The communication modem 325 is a module for performing communication with another node, and includes a radio processor and a base-band processor. The radio processor converts a signal received through an antenna into a base-band signal and provides the base-band signal to the base-band processor. Further, the radio processor converts the base-band signal received from the base-band processor into a radio signal so that the received signal can be transmitted through an actual wireless path, and then transmits the radio signal through the antenna.

The PDA controller 320 controls an overall operation of the portable terminal. In particular, the PDA controller 320 controls the USIM 330 and the switch 350 according to the teachings of the present invention.

The PDA controller 320 determines whether the communication modem 325 is turned off and establishes a communication path between the PDA controller 320 and the USIM 330 by controlling the switch 350 when the communication modem 325 is turned off.

The PDA controller 320 determines user information through the switch 350 from the USIM 330 and determines location information through a RF inside an USIM (not illustrated) or the RF 355 coupled to the USIM 330.

When the PDA controller 320 determines it is required for the portable terminal to control the camera 310 based on the user information and the location information, the PDA controller 320 disables the camera 310 or other peripheral devices of the terminal if its usage is not permitted.

The PDA controller 320 determines whether the communication modem 325 is turned on and establishes a communication path between the communication modem 325 and the USIM 330 by controlling the switch 350 when the communication modem 325 is turned on.

When the PDA controller 320 determines it is not required for the portable terminal to control the camera 310 based on the user information and the location information, the PDA controller 320 determines whether the communication modem 325 is turned on. When the communication modem 325 is turned on, the PDA controller 320 controls the switch 350 and establishes the communication path between the communication modem 325 and the USIM 330.

As explained above, it is possible for the portable terminal to control the camera attached to the portable terminal based on the location information and the user information when the communication modem, which controls the USIM, is turned off and when the portable terminal is not authorized.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for providing a peripheral device control in a portable terminal, the method comprising:
   providing a communication path directly between a communication modem and a storage through a switch;
   changing, by a controller, the communication path between the communication modem and the storage to a communication path between the controller and the storage via the switch when the communication modem is turned off;
   determining, by the controller, information necessary for the peripheral device control through the communication path between the controller and the storage, the information necessary for the peripheral device control including base station information of the portable terminal and user information obtained from the storage; and
   disabling, by the controller, the peripheral device based on an analysis of the user information and a determination that the base station information indicates a restrictive area,
   wherein the base station information is obtained from a receiving circuit included in the storage through the communication path between the controller and the storage.

2. The method of claim 1, further comprising
   changing, by the controller, the communication path between the controller and the storage to the communication path between the communication modem and the storage via the switch when the communication modem is turned on.

3. The method of claim 1, wherein the storage is a Universal Subscriber Identity Module (USIM).

4. The method of claim 1, wherein the peripheral device is a camera provided by or coupled to the portable terminal.

5. An apparatus for a peripheral device control in a portable terminal, comprising:
   a switch providing a communication path directly between a communication modem and a storage through the switch; and
   a controller for changing the communication path between the communication modem and the storage to a communication path between the controller and the storage via the switch when the communication modem is turned off, determining information, obtained from the storage, necessary for the peripheral device control through the communication path between the controller and the storage, the information necessary for the peripheral device control including base station information of the portable terminal and user information obtained from the storage, and,
   the controller being further configured to disable the peripheral device based on an analysis of the user information and a determination that the base station information indicates a restrictive area,
   wherein the base station information is provided through a receiver included within the storage.

6. The apparatus of claim 5, wherein the controller changes the communication path between the controller and the storage to the communication path between the communication modem and the storage via the switch when the communication modem is turned on.

7. The apparatus of claim 5, wherein the storage is a Universal Subscriber Identity Module (USIM).

8. The apparatus of claim 5, wherein the peripheral device is a camera provided by or coupled to the portable terminal.

9. A method for controlling a camera included within a portable communication terminal, the method comprising:
   turning a communication modem of the portable terminal off;
   determining, by a controller, whether to disable the camera when the communication modem is turned off, based on base station information of the portable terminal indicating a restrictive area, in conjunction with an analysis of user information read from a Universal Subscriber Identity Module (USIM) within the portable terminal and communicatively coupled to the controller,
   wherein the base station information is obtained from a receiving circuit included in the USIM through a communication path between a controller and the USIM.

* * * * *